(12) United States Patent  
Moehler et al.

(10) Patent No.: US 8,423,638 B2  
(45) Date of Patent: Apr. 16, 2013

(54) PERFORMANCE MONITORING OF A COMPUTER RESOURCE

(75) Inventors: Gregor Moehler, Stuttgart (DE); Stefanie Scherzinger, Boeblingen (DE); Torsten Steinbach, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 12/893,735

(22) Filed: Sep. 29, 2010

(65) Prior Publication Data

US 2012/0079098 A1 Mar. 29, 2012

(51) Int. Cl.  
*G06F 15/173* (2006.01)

(52) U.S. Cl.  
USPC .......................................... 709/224; 709/223

(58) Field of Classification Search .................. None  
See application file for complete search history.

(56) References Cited

U.S. PATENT DOCUMENTS

| | | | |
|---|---|---|---|
| 6,237,114 B1* | 5/2001 | Wookey et al. | 714/47.2 |
| 7,502,971 B2 | 3/2009 | Cohen et al. | |
| 7,673,189 B2 | 3/2010 | Duyanovich et al. | |
| 2005/0120109 A1 | 6/2005 | Delic et al. | |
| 2008/0209033 A1* | 8/2008 | Ginter et al. | 709/224 |
| 2009/0254551 A1 | 10/2009 | Stluka et al. | |

OTHER PUBLICATIONS

Steven Bird and Mark Liberman, "A Formal Framework for Linguistic Annotation", Speech Communication 33(1, 2), pp. 23-60, Dec. 2001.

Whei-Jen Chen et al., DB2 Performance Expert for Multiplatforms V2.2, IBM Redbooks publication, ISBN 0738496413, http://www/redbooks.ibm.com/abstracts/sg246470.html, Mar. 2006. Entire publication, particularly Chapters 4 & 5.

Apache UIMA Specification. http://incubator.apache.org/uima/, May 2008.

* cited by examiner

*Primary Examiner* — John B. Walsh  
(74) *Attorney, Agent, or Firm* — Terry J. Carroll; Edell, Shapiro & Finnan LLC

(57) ABSTRACT

A method, computer program product, and system for performance monitoring of a computer resource utilized by a user community. The computer resource is monitored, and sets of performance metrics characterizing a state of the computer resource are collected and analyzed to detect performance incidents. External information such as contextual information and user annotations are also collected and analyzed. If a performance incident is detected, its set of performance metrics and associated external information are used to search a data repository of past performance incidents for related incidents, in order to identify critical performance incidents, determine recommended solutions for the performance incidents, and determine performance forecasts for the computer resource.

13 Claims, 5 Drawing Sheets

PERFORMANCE MONITORING OF A COMPUTER RESOURCE

BACKGROUND

1. Technical Field

The present invention relates generally to monitoring performance of computer resources, and more particularly to methods and systems for monitoring performance of computer resources using annotations and external contextual information.

2. Discussion of Related Art

The performance of computer resources such as databases are generally monitored using performance metrics. If a computer resource is not functioning as expected, an administrator may be called in to diagnose and solve the problem. The administrator may utilize the performance metrics to diagnose the problem, but has no way of knowing if similar problems have occurred before, and how prior administrators solved the problems. Without a systematic and automated way to leverage past diagnostic and solution efforts when problems arise, the administrator may duplicate past efforts and be inefficient in solving problems.

BRIEF SUMMARY

Accordingly, embodiments of the present invention include a method, computer program product and a system for performance monitoring of a computer resource in a computer system utilized by a user community, comprising collecting a first set of performance metrics that characterize a state of a computer resource in a computer system utilized by a user community, receiving first external information related to the first set of performance metrics from a source other than the computer resource, where the first external information comprises one or both of contextual information and user-provided annotation information, designating the first set of performance metrics as representing a first performance incident, storing a first incident record for the first performance incident in a data repository comprising a plurality of stored incident records stored therein, where the first incident record comprises the first set of performance metrics and the first external information, and where each stored incident record in the plurality comprises a stored set of performance metrics that characterize a past state of the computer resource and represent a past performance incident, and stored external information related to the past performance incident, searching the data repository using both the first performance metrics and the first external information to identify stored incident records that are related to the first performance incident, where if a stored set of performance records is similar to the first set of performance metrics or the first external information, or if stored external information is similar to the first set of performance metrics or the first external information, then the stored incident record comprising the similar performance metrics or similar external information is identified as a related incident record; and if any of the plurality of stored incident records are identified as related to the first incident record, communicating an alert or the stored incident records to at least one member of the user community.

Other embodiments of the present invention include a method, computer program product and a system for performance monitoring of a computer resource in a computer system utilized by a user community, comprising receiving from a performance monitor a first set of performance metrics that characterize a state of the computer resource, displaying the first set of performance metrics to a user, receiving from the user first annotation information related to the first set of performance metrics, where the first annotation information designates the first set of performance metrics as representing a first performance incident, providing the received first annotation information to the performance monitor, receiving from the performance monitor one or more stored incident records that are related to the first performance incident, where each stored incident record comprises a stored set of performance metrics that characterize a past state of the computer resource and represent a past performance incident, and stored external information related to the past performance incident, where the stored external information comprises one or both of contextual information and user-provided annotation information, and where a stored incident record is related to the first performance incident if its stored set of performance metrics is similar to the first set of performance metrics or the first annotation information, or its stored external information is similar to the first set of performance metrics or the first annotation information, and displaying the received one or more stored incident records to the user.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

The present embodiments improve the performance monitoring of computer resources based on the integration of external information (e.g., user-provided annotations and externally available contextual information) in addition to performance metrics. Briefly, a system of the present embodiments automatically collects and derives performance metrics related to a computer resource, identifies a set of performance metrics that describes an observed performance incident, and summarizes the incident in an incident record based on the performance metrics at that point in time. The system also collects and searches contextual information from sources external to the computer resource (e.g., calendars, business processes, help desk systems, etc.) to find aspects of the contextual information that coincide with the detected performance incident, and adds this contextual information to the incident record. An administrative user may monitor the performance metrics, attach textual annotations to a set of performance metrics, tag particular performance metrics, and designate a set of performance metrics as representing a performance incident. The system uses the combination of the performance metrics and the external information to search for related performance incidents, in order to formulate a recommended solution to the user, alert the user of critical incidents, and formulate performance forecasts about future incidents.

Figure 1:
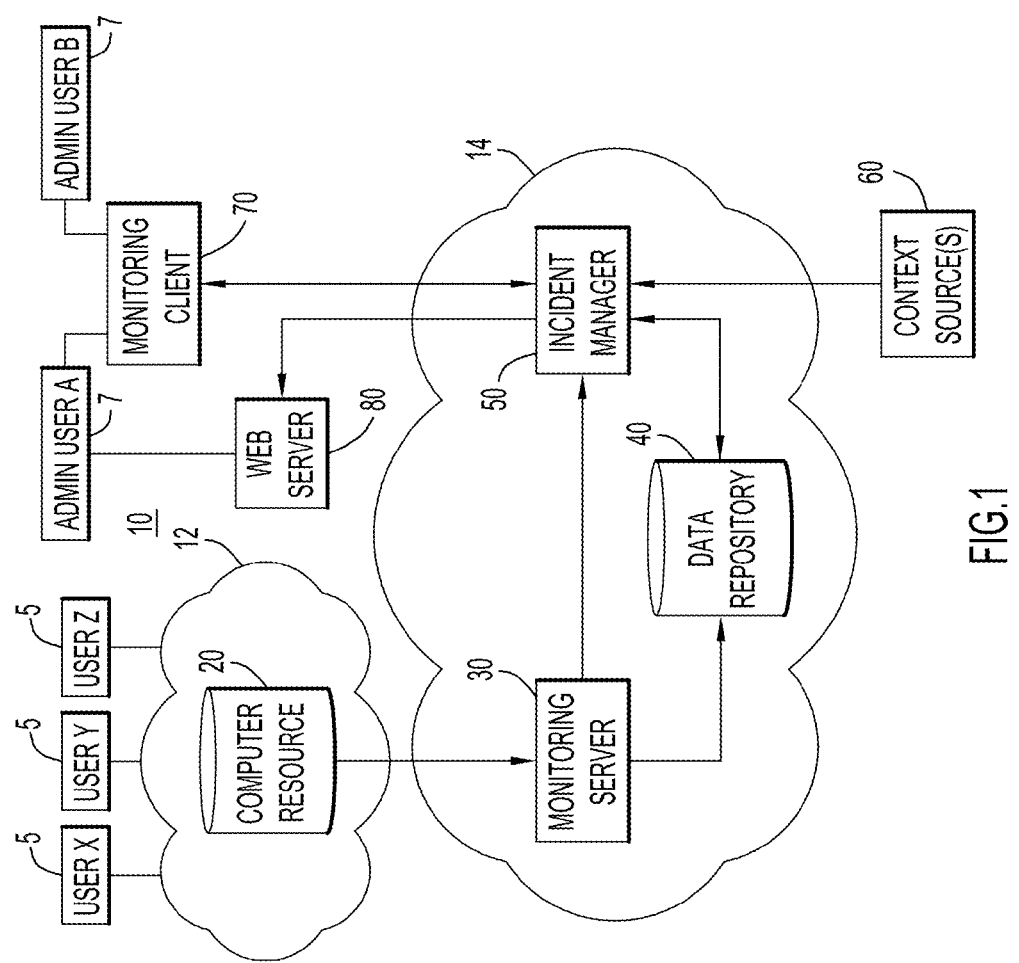
FIG. 1 is a block diagram illustrating an exemplary computer system comprising a performance monitoring system according to an embodiment of the present invention.

Referring now to the Figures, an exemplary computer system 10 according to embodiments of the present invention is illustrated in FIG. 1. The exemplary computer system 10 comprises a system 12 including a computer resource 20 to be monitored by performance monitoring system 14. Computer resource 20 may be any suitable computer resource of which performance monitoring is desired. For example, the computer resource 20 may be a computer system (e.g., a network, server, or server group), a hardware component (e.g., processors, memory, and storage devices such as hard disk drives or solid state drives), software (e.g., operating systems, applications, databases, web services, etc.), or a combination of both hardware and software components. For example, the computer resource 20 may be a database system or an application server. The computer resource 20 may be utilized by a community of resource users 5 represented in FIG. 1 by user clients x, y and z.

The performance metrics may be any measurable feature of the computer resource that affects performance, or may be derived directly or indirectly from such measurable features. For example, if the computer resource 20 is a database, the performance metrics may include processor utilization, throughput rate, average response time, waits in tables and indexes, sort efficiency, I/O analysis, memory utilization, disk utilization, etc. The performance metrics may have scalar or vector values. The performance metrics may be collected from any suitable source, for example, if the computer resource 20 is a database system, the performance metrics may be collected from the database itself, applications connected to the database, the database host system, the network transporting queries and results, etc., so that the performance of the database instances, the operating system of the database server, and the database access stack may be monitored. Derived performance metrics may be generated by, e.g., the monitoring server 30 or the incident manager 50. A set of performance metrics, as referred to herein, means a collection of one or more performance metrics that characterize a state of the computer resource at given time or over a given time interval.

The exemplary performance monitoring system 14 comprises a monitoring server 30, data repository 40, and incident manager 50, and is operatively coupled to the system 12 including the computer resource 20 and to one or more context sources 60, a monitoring client 70, and a web server 80. As shown, the performance monitoring system 14 is a cloud-implemented system, however it is understood that it may be implemented in a cloud, data center, distributed network, storage area network (SAN), or in any other suitable system, for example in a system designed for the provision of Software-as-a-Service (SaaS), such as a cloud data center or hosted web service. The performance monitoring system 14, and particularly monitoring client 70, may be utilized by one or more administrative users 7 represented in FIG. 1 by admin users A and B. The resource users 5 and the administrative users 7 may be collectively referred to herein as a user community.

The monitoring server 30 is operatively coupled to the system 12 including the computer resource 20 such that it can monitor the computer resource 20 and collect and derive performance metrics from the system 12 relating to the computer resource 20. The monitoring server 30 may store the performance metrics in the data repository 40, or may send the performance metrics directly to the incident manager 50. Data repository 40 may be implemented by any conventional or other memory or storage device, and may be volatile (e.g., RAM, cache, flash, etc.), or non-volatile (e.g., ROM, harddisk, optical storage, etc.), and include any suitable storage capacity. The data repository 40 may be, for example, a database implemented on a solid state drive or in a RAM cloud.

The incident manager 50 analyzes the incoming metrics, whether received from the monitoring server 30 or retrieved from the data repository 40, may derive additional metrics, and detects if a performance incident has occurred, for example by determining that one or more of the performance metrics have abnormal values (e.g., an outlier value), or by receiving a user designation of an incident. The incident manager 50 also receives external information related to the first performance incident from a source other than the computer resource, for example contextual information from the context source 60, or user-provided annotation information from monitoring client 70, etc. This information is stored with the performance metrics in the data repository 40 as an incident record. The incident manager 50 also compares the incident record of the first performance incident with other incident records stored in the data repository 40, in order to provide status alerts, performance forecasts, and recommended solutions to administrative users, e.g., via monitoring client 70, or to the community of users 5, e.g., via posting an alert and performance forecast to web server 80.

User clients 5, administrative user clients 7, monitoring server 30, incident manager 50, monitoring client 70, and web server 80 may each be implemented in the form of a processing system, or may be in the form of software. They can be implemented by any quantity of conventional or other computer systems or devices (e.g., computer terminals, personal computers (e.g., IBM-compatible PC, Apple Mac, tablet, laptop, netbook, etc.), etc.), cellular telephones, personal data assistants (e.g., Palm Pre, Droid, iPhone, iPad, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include processors, memories, internal or external communications devices (e.g., modem, network card, etc.), displays, and input devices (e.g., physical keyboard, touch screen, mouse, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

Context source(s) 60 may be any source of contextual information, i.e., information relevant to the performance of the computer resource 20 from an external (e.g., outside the computer resource) source that provides context to the performance metrics. For example, if the computer resource 20 is a stock exchange database system, the contextual information may be stock indices such as the DAX, Dow Jones Industrial Average, FTSE 100, EuroStoxx 50, Nikkei 225, or the S&P 500, and the context source 60 may be a source of the stock indices such as a data feed. Or, if for example the computer resource 20 is a business process system, the contextual information may be help desk tickets from a context source such as a data feed from a problem tracking system or help desk system, calendar information, information about other business processes, etc. The contextual information may be received in any suitable data exchange format, for example a data feed such as an RSS feed or Atom feed, a news-ticker, or a raw data feed, a SOA-style message, or in a proprietary format. The contextual information may be structured, for example a number representing a stock index value, or unstructured, for example a text RSS feed.

Monitoring client 70 may be any client or device that permits an administrative user, for example a system administrator, to interact with the performance monitoring system 14. For example a database administrator may desire to manually search the data repository at the beginning of her work shift to determine if any performance incidents occurred prior to that time, and may use the monitoring client 70 to query the system. The administrator may also provide user annotations to sets of performance metrics using the monitoring client 70, where the annotations may, e.g., designate a performance incident, interpret a performance incident, or provide additional information regarding the environment outside of the computer resource. The annotations may be any additional information attached or linked to a particular set of performance metrics, that may describe the behavior of a set of metrics, generally describe the problem represented by a performance incident (e.g., "system slow"), or to describe specific aspects of a performance incident. For example, the annotations may be hierarchical and include descriptions of the problem as a whole as well as specific details about the problem. The annotations may be structured, for example a tag from a pre-defined tag set, or may be unstructured, for example a free-text comment.

Performance monitoring system 14, and the computer system 10 as a whole, may include additional servers, clients, and other devices not shown, and individual components of the system may occur either singly or in multiples, for example, there may be more than one computer resource in the system, or for example, the functionality of monitoring server 30 and incident manager 50 may be combined into a single device or split among multiple devices. The computer system 10 may also be a node, for example a node in a computing cluster, which is connected to other nodes by suitable means, for example via a network. It is understood that any of the various components of the computer system 10 may be local to one another, or may be remote from and in communication with one or more other components via any suitable means, for example a network such as a WAN, a LAN, Internet, Intranet, mobile wireless, etc.

Figure 2:
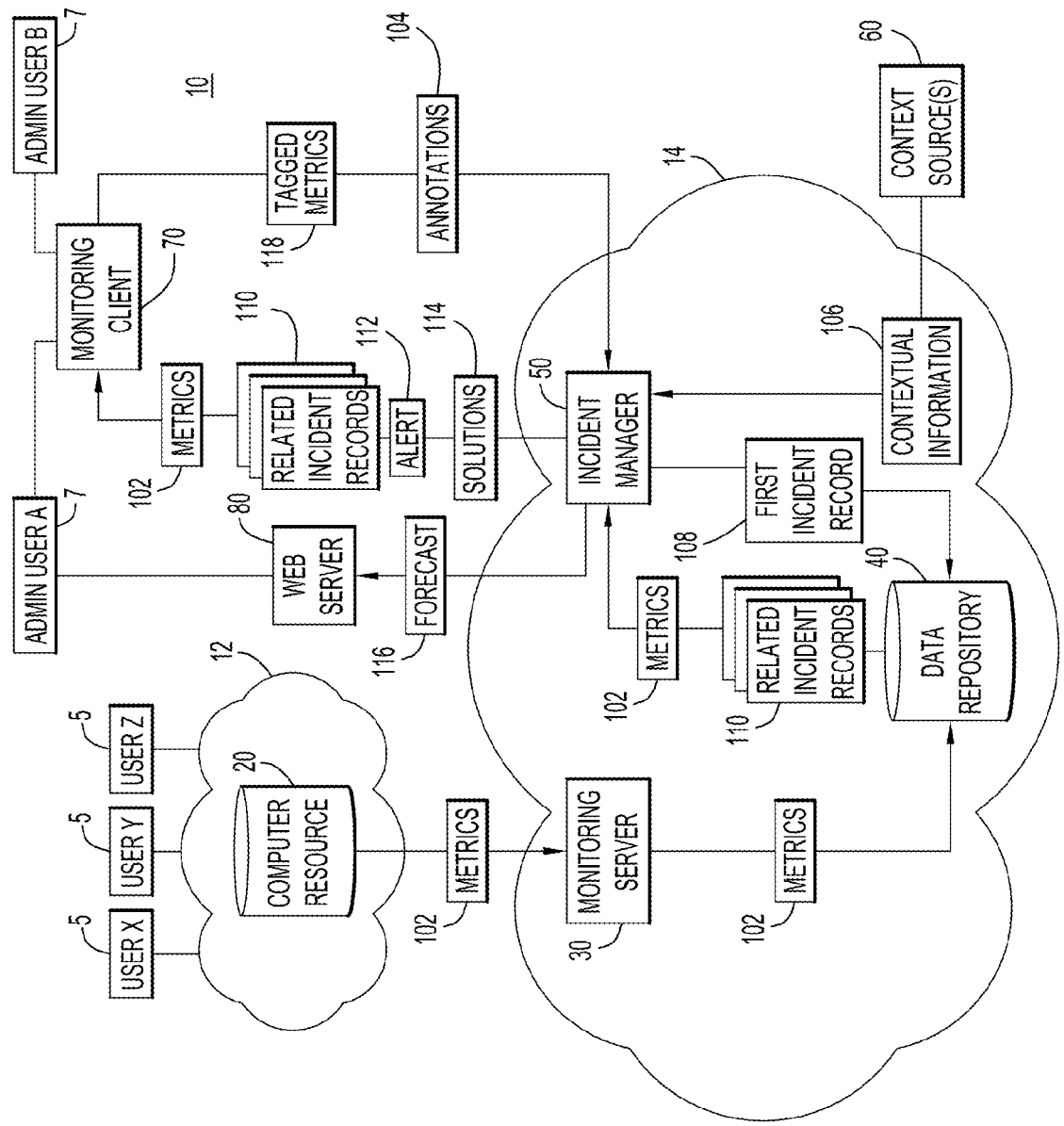
FIG. 2 is a block diagram illustrating an exemplary monitoring process in a performance monitoring system according to an embodiment of the present invention.

Referring now to FIG. 2, the operation of the system that has been previously described may be understood by following an exemplary flow of information through the system 10. FIG. 2 illustrates a monitoring process, in which a first set of performance metrics 102 characterizing a state of the computer resource are collected by the monitoring server 30, stored in the data repository 40, retrieved by incident manager 50, and communicated by the incident manager 50 to the monitoring client 70. The system 10 may automatically identify the first set of performance metrics as relating to a first performance incident, or the administrative user may designate the first set of performance metrics as relating to the first performance incident. External information in the form of user-provided annotations 104 is communicated by the monitoring client 70 to the incident manager 50, and in the form of contextual information 106 related to the first performance incident is communicated from the context source 60 to the incident manager 50. The incident manager 50 stores the first set of performance metrics and the external information as a first incident record 108 in the data repository 40. The incident manager 50 searches the data repository 40 using both the performance metrics and the external information to identify related incident records 110, and analyzes these records and also may communicate them to monitoring client 70. The incident manager 50 also communicates alerts 112 and recommended solutions 114 to monitoring client 70, and posts performance forecasts 116 to web server 80. The administrative user may also tag one or more of the performance metrics as key metrics, and these tagged metrics 118 are communicated from monitoring client 70 to the incident manager 50 for inclusion in the first incident record 108.

Figure 3A:
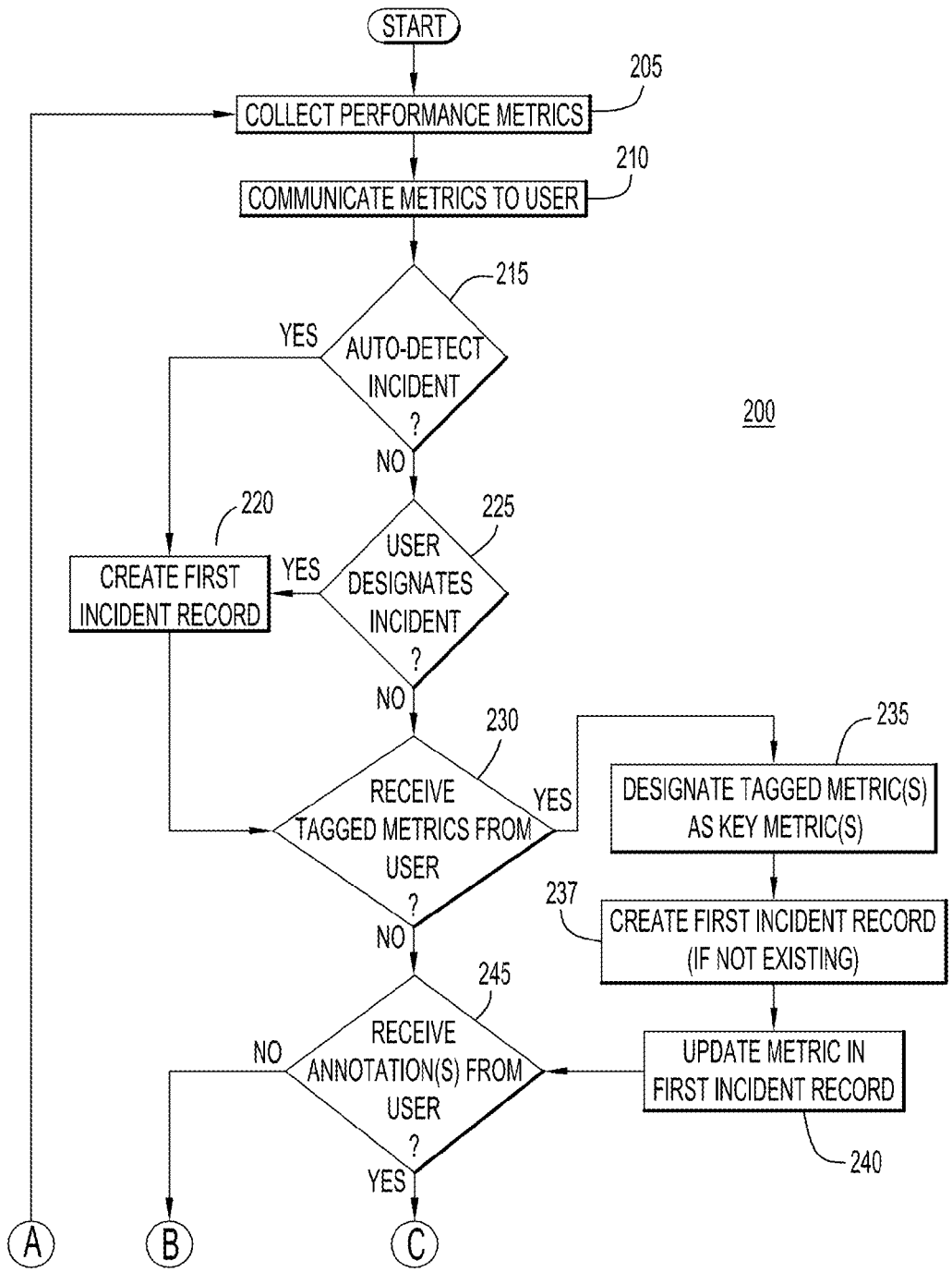
FIGS. 3A and 3B illustrate a flowchart depicting an exemplary process of monitoring performance metrics and creating incident records according to an embodiment of the present invention.
Figure 3B:
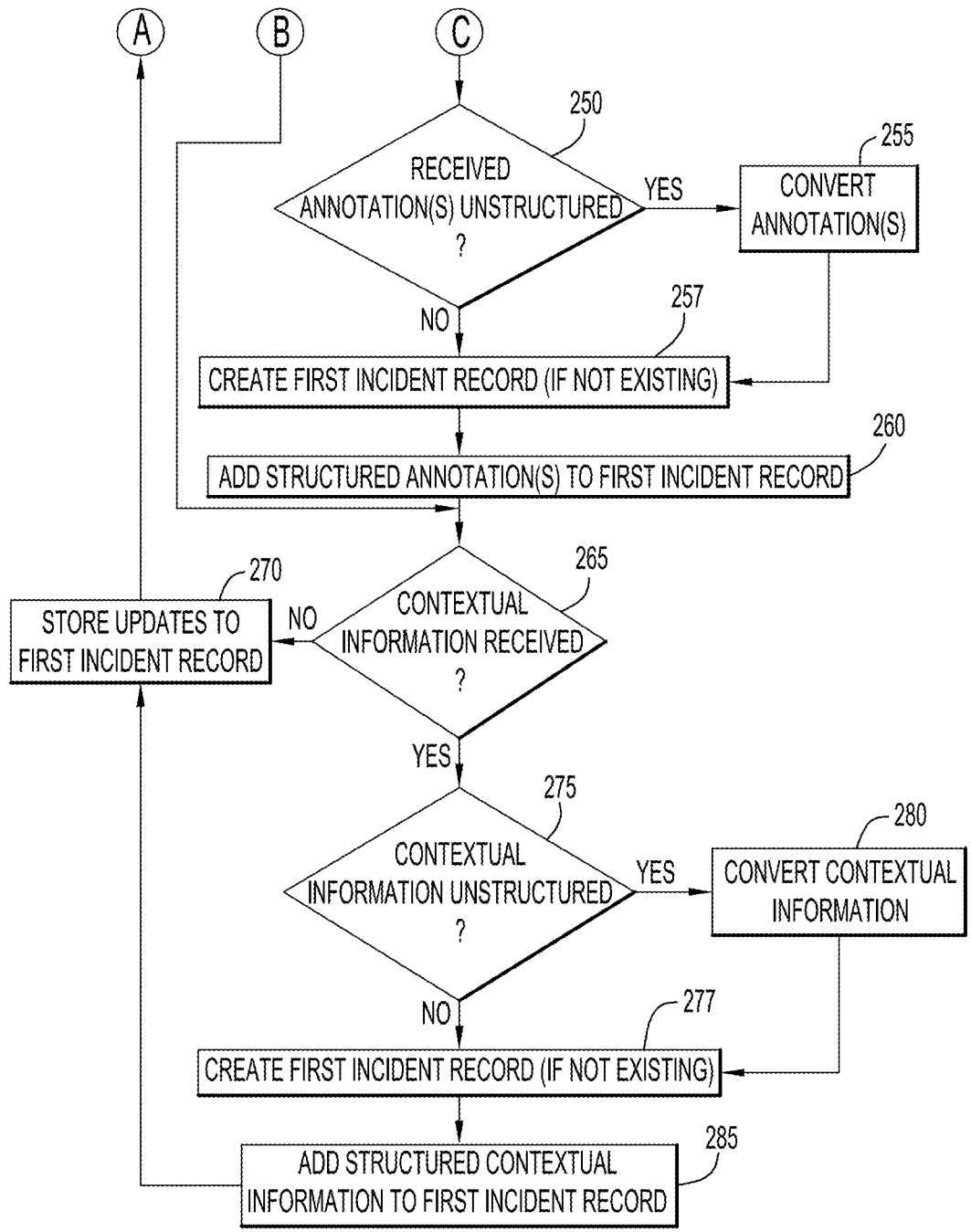

Referring now to FIGS. 3A and 3B, reference numeral 200 generally designates a flow chart depicting an exemplary method of monitoring the performance of a computer resource that is a database system, which may be carried out by the performance monitoring system 14 previously described. In step 205, the performance monitoring system, also referred to as the performance monitor, collects (e.g., measures and/or derives) the performance metrics as described above, and analyzes the performance metrics. For ease of description, the remainder of the process will be discussed with reference to a first set of performance metrics, which characterize a state of the computer resource, but it is understood that the performance monitor collects and processes many such sets of performance metrics throughout the course of, e.g., a day, week, or month, and each such set of performance metrics characterizes a state of the computer resource at a particular point in time, or over a particular time interval.

In step 210 the performance monitor communicates the first set of performance metrics to a user, for example by displaying them to an administrative user 7 using a display of the monitoring client 70. The user then has the ability to examine and manipulate the first set of performance metrics, for example via a GUI or other structured interface, and may tag one or more performance metrics in the set to emphasize their importance. In step 215 the performance monitor determines if a first performance incident has been automatically detected, for example by running various heuristics on the first set of performance metrics to determine whether the metrics match pre-determined incident criteria. If an incident is detected, then in step 220 the performance monitor creates a first incident record, adds the first set of performance metrics to the first incident record, and proceeds to step 230.

If no incident was auto-detected, then in step 225 the performance monitor determines if a user has designated the first set of performance metrics as a first performance incident, for example by an administrative user selecting an incident tag, submitting a particular annotation, tagging one or more performance metrics in the first set as remarkable, etc. If the user has designated an incident, then in step 220 the performance monitor creates a first incident record, and adds the first set of performance metrics to the first incident record, and proceeds to step 230. Otherwise, the performance monitor proceeds to step 230.

In step 230, the performance monitor determines if it has received any tagged performance metrics from the user, for example by an administrative user tagging the metrics via monitoring client 70, and if not, proceeds to step 245. If yes, then in step 235 the performance monitor designates the user-tagged performance metrics as key metrics, which will be given a higher weight than non-key metrics when the similarity of sets of performance metrics are compared. In step 237, a first incident record will be created for the first set of performance metrics if it was not previously created, because the receipt of user-tagged metrics will act as a user designation of a first performance incident. In step 240, the performance monitor updates the first set of performance metrics in the first incident record to reflect the designation of the key metrics, and then proceeds to step 245.

In step 245, the performance monitor determines if it has received one or more annotations from the user related to the first performance incident, and if not, proceeds to step 265. If yes, then in step 250 the performance monitor determines whether the annotation(s) are unstructured. If not, the process proceeds to step 257, but if yes, then in step 255 the performance monitor converts the unstructured format of the received annotation(s) into a structured form, and then proceeds to step 257. In step 257, a first incident record will be created for the first set of performance metrics if it was not previously created, because the receipt of user annotations will act as a user designation of a first performance incident. In step 260, the performance monitor adds the structured annotation(s) to the first incident record.

In step 265 the performance monitor determines whether it has received contextual information related to the first performance incident, for example by comparing a timestamp of the first performance incident with a timestamp of the contextual information, by noticing a trend in the contextual information occurring within a certain interval of the first performance incident, or in any other suitable manner. If not, the process proceeds to step 270. If yes, then in step 275 the performance monitor determines whether the contextual information is unstructured. If not, the process proceeds to step 277, but if yes, then in step 280 the performance monitor converts the unstructured format of the received contextual information into a structured form, and then proceeds to step 277. In step 277, a first incident record will be created for the first set of performance metrics if it was not previously created, because the receipt of contextual information will act as a designation of a first performance incident. In step 285, the performance monitor adds the structured contextual information to the first incident record, and then proceeds to step 270, where the first incident record is stored, for example in the data repository. After step 270, the process returns to step 205 and continues collecting the incoming metrics.

The unstructured format of the external information (e.g., annotations or contextual information) may be converted into a structured form by any suitable means. For example, the performance monitor may implement or comprise a conversion framework or information extraction tool, or be operatively coupled to such a framework or tool, in order to convert unstructured information to structured information. Exemplary conversion frameworks and information extraction tools include the Apache UIMA framework, Autonomy Intelligent Data Operating Layer (IDOL), the General Architecture for Text Engineering (GATE), IBM Cognos Content Analytics, IBM Text Analysis and Knowledge Mining (TAKMI), and RapidMiner. For example, the performance monitor may implement the Apache UIMA framework, which has components that use tools such as text-chunking, recognizing named entities, relating synonyms, etc., to convert the unstructured format into a structured format, for example converting an annotation written in complete sentences into its main words, e.g., by removing the effects of declinations and conjugations, by resolving anaphora, etc., or by mapping the unstructured text to a suitable number of key words.

It is understood that there is no time limit on process 200, in that the system may, for example, collect performance metrics on Day 1, receive contextual information on Day 2, and not until Day 7 receive user annotations designating the performance metrics as a first performance incident. Or, in another example, the system may automatically detect an incident on Day 1, receive user annotations on Day 3, receive contextual information on Day 5, receive additional annotations on Day 7, etc.

Figure 4:
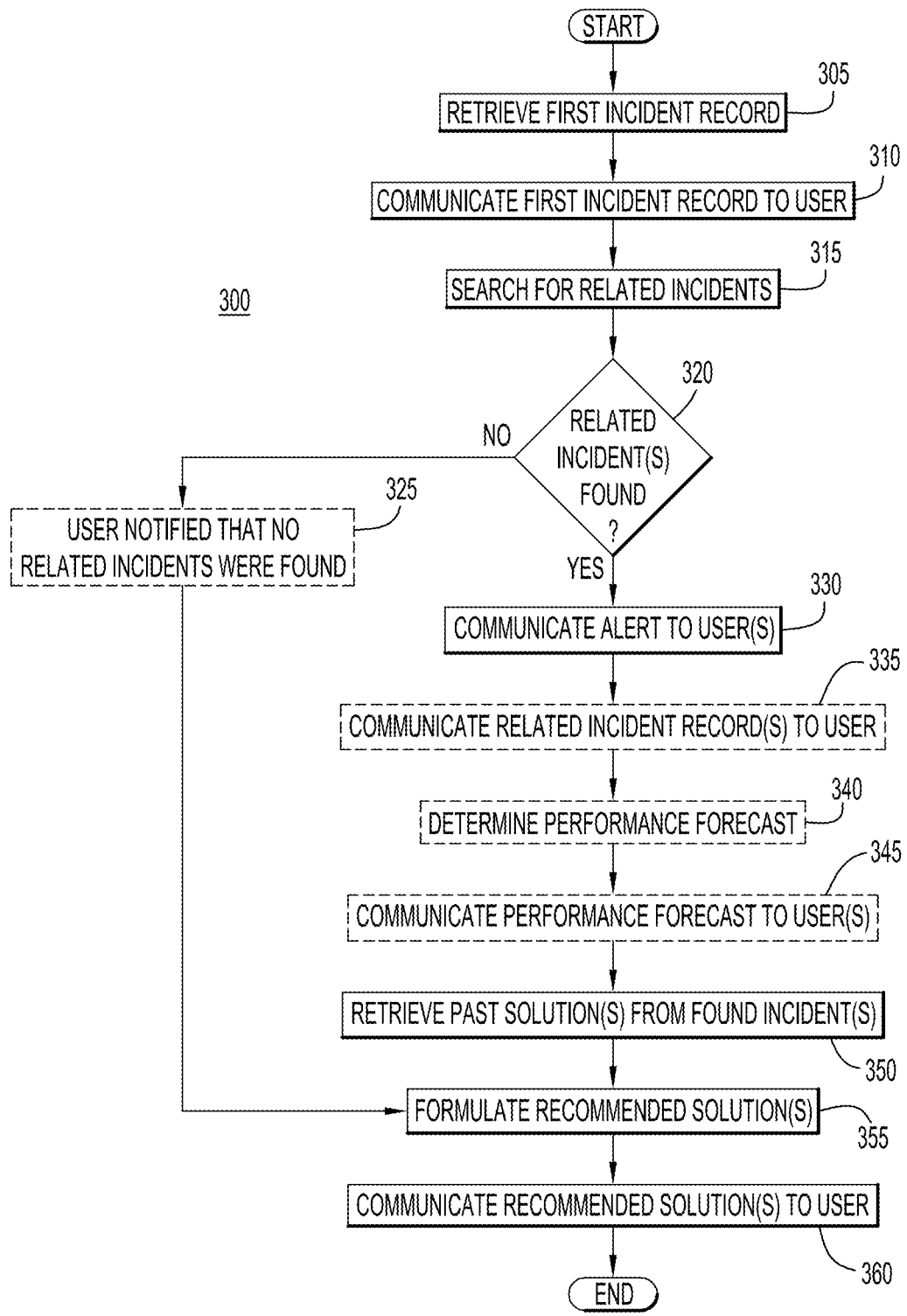
FIG. 4 is a flowchart depicting an exemplary process of utilizing incident records to monitor performance according to an embodiment of the present invention.

Referring now to FIG. 4, reference numeral 300 generally designates a flow chart depicting an exemplary method of utilizing incident records to monitor a computer resource that is a database system, which may be carried out by the performance monitor 14 previously described. Process 300 may occur at any time relative to process 200, except that each respective performance incident is detected or designated in process 200 prior to searching for related incidents in process 300. For example, the performance monitor may cycle through process 200 several times in one day, for example collecting 30 sets of performance metrics, detecting a total of three performance incidents, and then be in the process of detecting another performance incident when an administrative user initiates process 300. The performance monitor may self-initiate process 300, or the process may be initiated by, e.g., an administrative user.

In step 305, the performance monitor retrieves an incident record for a particular performance incident, which will be referred to as the first incident record for a first performance incident. In step 310 the performance monitor communicates the first incident record to the user, for example by displaying it to an administrative user using a display of the monitoring client 70.

In step 315, the performance monitor searches the incident records already stored in the data repository (the stored incident records) to identify related records, e.g., records of performance incidents that are similar to the first incident record. Each of the stored incident records comprises a stored set of performance metrics that characterize a past state of the computer resource and represent a past performance incident, and external information related to the past performance incident, which external information comprises one or both of contextual information and user-provided annotation information. Each stored incident record may also comprise solution information related to a resolution of the past performance incident.

The performance monitor identifies a stored incident record as related if any of the information it contains is similar to any of the information in the first incident record. For example, if a stored set of performance metrics is similar to the first set of performance metrics or the first external information, or if stored external information is similar to the first set of performance metrics or the first external information, then the stored incident record comprising the similar performance metrics or similar external information is identified as a related incident record. The similarity between the first incident record and the stored incident records may be determined by any suitable means, for example by the application of a distance metric that identifies and specifies a degree of similarity, e.g., a Levenshtein distance, Hamming distance, Damerau-Levenshtein distance, etc. Generally, the information is considered "similar" if it has a low distance. For example, an administrative user may determine a "minimum similarity" to be considered "similar", for example by requiring the similarity to be equal to or less than a certain Levenshtein distance. The distance metric may utilize an ontology of technical terms expected to be present in the external information that describes the relationships between various technical terms and other terms or performance metrics, for example, the ontology may relate "low performance" to "long response time" and a performance metric value showing low throughput, etc. The distance metric may assign a higher weight to user-designated key metrics than non-designated metrics when determining similarity.

In step 320, the performance monitor determines if any related records representing related incidents were found in the search, and if not, in step 325 may optionally notify the user that no related incidents were found, and then proceeds to step 355. If yes, then in step 330 the performance monitor communicates an alert to a user of the computer resource, such as a member of the user community, or an administrative user of the monitoring client 70. This communication may be performed by any suitable means, for example displaying an alert message to an administrative user of the monitoring client 70, or by posting an alert to the web server 80, etc.

In optional step 335 the performance monitor communicates the related incident record(s) to the administrative user, for example by displaying the related record(s) on the monitoring client 70. In optional step 340, the performance monitor uses the related stored incident records to determine a performance forecast for the resolution of the first performance incident, and in step 345 communicates the performance forecast to a user of the computer resource, such as a member of the user community, or an administrative user. Steps 335, 340 and 345 are optional because they are not essential for the performance monitor to function, and they may each be implemented in certain systems as desired by the system administrators.

In step 350, the performance monitor retrieves the solution information (if present) from the related incident records. This solution information is generally an annotation or portion of an annotation in a related incident record or records that proposes or describes a solution in whole or part to a particular performance incident. E.g., the solution information may comprise an annotation that describes resolving a performance incident by adjusting the timing of a business process run on the same server as the computer resource so that the business process does not run concurrently with the computer resource. In step 355, the performance monitor uses the information in the first incident record and in any related stored incident records, and particularly any solution information that was retrieved, to formulate a recommended solution or solutions to the first performance incident. This recommendation may be, e.g., a summary of past solution information, an amalgamation of past solution information, a solution extracted from a commercial solutions database, etc. In place of a recommendation, or in addition thereto, the system may also communicate the related incident record(s) to the user, as described previously with respect to step 335. In step 360, the performance monitor communicates the recommended solution(s) to an administrative user of the computer resource, for example by displaying the recommended solution(s) on the monitoring client 70. Then process 300 ends.

The benefits of the present embodiments include the ability of the user to describe a performance incident, compare it to prior incidents, and communicate about incidents, based on the integration of performance metrics with external information from outside of the computer resource. These benefits facilitate performance monitoring in a number of ways, such as by allowing better and more holistic monitoring because more information is available, facilitating collaborative monitoring by building a shared knowledge base of prior incidents and their solutions that can be shared among co-administrators, successive administrators, or throughout an enterprise, automatically detecting critical incidents without the need for administrator action by a user, etc. These benefits are illustrated by the following examples.

In a first exemplary scenario, the ability of a database administrator (DBA) to discover and analyze a performance incident is enhanced by the present embodiments. The system provides the DBA with a set of performance metrics showing slow performance, and the DBA adds an annotation (e.g. "low performance") to the set of metrics, and also tags certain metrics as remarkable, e.g., processor utilization is tagged. The system creates an incident record based on the DBA's annotation and tagging, and searches for related incidents that have similar metrics and similar annotations or contextual information, with particular emphasis on the tagged metric of processor utilization. The search locates related incident records and communicates them to the DBA, who may browse through the incident records and obtain insight into the present performance incident.

For example, the related incident records may contain annotations revealing that low performance is triggered by a certain action in the local business process. The DBA is able to use this information to reschedule execution of the conflicting action to other weekdays so that the database performance is not affected. Or, for example, the related incident records may contain annotations revealing that similar performance incidents only occur sporadically when a particular application is run. The DBA may use this information to determine that this performance incident may be ignored because it is not critical and is unlikely to occur again.

In another example, the system may finds a correlation between the performance incident and an external help desk system, because related incident records reveal that similar performance incidents in the past were often correlated with an increase in help desk tickets from a particular user group. The system may develop a performance forecast based on the related incidents, and communicate this forecast to the users of the computer resource, e.g., "low performance is expected this afternoon" so that users may plan ahead for difficulties. The automated forecasting alerts users about problematic situations ahead of time, and allows the DBA to focus on improving the performance issues. In still another example, the system may determine that the performance incident annotated by the DBA resembles a past performance incident that is described in stored incident record, and may retrieve the stored incident record and its solution information to guide the DBA through a solution strategy that worked to resolve the similar performance incident in the past.

In a second exemplary scenario, the present embodiments provide automated performance indications, for example by automatically detecting critical performance incidents and posting alerts of such incidents to a web server without the need for action by the DBA, so that users (e.g., an administrative user, or a resource user) may navigate to the web page and discover that the computer resource is experiencing performance issues or outages. Thus, performance information is automatically provided on short notice to users. The system may also automatically provide performance forecasts, to alert users and/or the DBA of expected performance and permit the DBA to avoid the forecasted incidents, for example by re-scheduling the execution of particular applications to avoid future bottlenecks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for performance monitoring of a computer resource in a computer system utilized by a user community, comprising:

receiving from a performance monitor a first set of performance metrics that characterize a state of the computer resource;

displaying the first set of performance metrics to a user;

receiving from the user first annotation information related to the first set of performance metrics, and a designation of the first set of performance metrics as representing a first performance incident;

providing the received first annotation information and the received designation to the performance monitor;

in response to providing the received first annotation information and the received designation to the performance monitor, receiving from the performance monitor one or more stored incident records that are related to the first performance incident, wherein each stored incident record comprises a stored set of performance metrics that characterize a past state of the computer resource and represent a past performance incident, and stored external information related to the past performance incident, wherein the stored external information comprises one or both of contextual information from a source other than the computer resource and user-provided annotation information, and wherein a stored incident record is related to the first performance incident if its stored set of performance metrics is similar to the first set of performance metrics or the first annotation information, or its stored external information is similar to the first set of performance metrics or the first annotation information; and displaying the received one or more stored incident records to the user.

2. A computer program product for performance monitoring of a computer resource in a computer system utilized by a user community, comprising:

a computer readable storage device having computer readable program code stored thereon, the computer readable program code comprising computer readable program code configured to:

collect a first set of performance metrics that characterize a state of a computer resource in a computer system utilized by a user community;

receive first external information related to the first set of performance metrics from a source other than the computer resource, wherein the first external information comprises one or both of contextual information and user-provided annotation information;

designate the first set of performance metrics as representing a first performance incident;

store a first incident record for the first performance incident in a data repository comprising a plurality of stored incident records stored therein, wherein the first incident record comprises the first set of performance metrics and the first external information, and wherein each stored incident record in the plurality comprises a stored set of performance metrics that characterize a past state of the computer resource and represent a past performance incident, and stored external information related to the past performance incident;

search the data repository using both the first performance metrics and the first external information to identify stored incident records that are related to the first performance incident, by determining the similarity of the first set of performance metrics to the stored sets of performance metrics and to the stored external information, and determining the similarity of the first external information to the stored sets of performance metrics and to the stored external information, wherein if a stored set of performance metrics is similar to the first set of performance metrics or the first external information, or if stored external information is similar to the first set of performance metrics or the first external information, then the stored incident record comprising the similar performance metrics or similar external information is identified as a related incident record; and if any of the plurality of stored incident records are identified as related to the first incident record, communicate an alert to at least one member of the user community.

3. The computer program product of claim 2, wherein said receipt of the first external information comprises the computer readable program code being further configured to:

receive at least some of the first external information in an unstructured format;

convert the unstructured format into a structured format to produce structured first external information for storage in the first incident record.

4. The computer program product of claim 3, wherein the first external information is user-provided annotation information received from at least one member of the user community.

5. The computer program product of claim 2, wherein said receipt of the first external information comprises the computer readable program code being further configured to:

receive contextual information from a data feed, and wherein the source other than the computer resource is a feed source.

6. The computer program product of claim 2, wherein said determining similarity comprises the computer readable program code being further configured to:
    determine similarity using a distance metric.

7. The computer program product of claim 2, wherein the computer readable program code is further configured to:
    communicate the first set of performance metrics to a monitoring client device; and
    receive from the monitoring client device a user designation of one or more performance metrics in the first set of performance metrics as key metrics, wherein the key metrics are assigned a higher weight in the determination of similarity than the performance metrics that have not been designated.

8. The computer program product of claim 2, wherein said designation of the first set of performance metrics as representing the first performance incident comprises the computer readable program code being further configured to:
    receive a user designation of the first set of performance metrics as representing the first performance incident.

9. The computer program product of claim 2, wherein said designation of the first set of performance metrics as representing the first performance incident comprises the computer readable program code being further configured to:
    automatically generate said designation based on pre-determined incident criteria.

10. The computer program product of claim 2, wherein, for one or more of the related stored incident records, the external information comprises user-provided annotation information related to a solution of the past performance incident, and the computer readable program code is further configured to:
    determine, using the user-provided annotation information related to the solution of the past performance incident, one or both of a performance forecast for the first performance incident and a recommended solution for the first performance incident; and
    communicate the performance forecast, if it was determined, and the recommended solution, if it was determined, to at least one member of the user community.

11. The computer program product of claim 2, wherein said collection of the first set of performance metrics comprises the computer readable program code being further configured to:
    derive at least some of the performance metrics from measurable metrics of the computer resource.

12. The computer program product of claim 2, wherein the computer readable program code is further configured to:
    communicate the related stored incident records to at least one member of the user community.

13. A computer program product for performance monitoring of a computer resource in a computer system utilized by a user community, comprising:
    a computer readable storage device having computer readable program code stored thereon, the computer readable program code comprising computer readable program code configured to:
    receive from a performance monitor a first set of performance metrics that characterize a state of the computer resource;
    display the first set of performance metrics to a user;
    receive from the user first annotation information related to the first set of performance metrics, and a designation of the first set of performance metrics as representing a first performance incident;
    provide the received first annotation information and the received designation to the performance monitor;
    in response to providing the received first annotation information and the received designation to the performance monitor, receive from the performance monitor one or more stored incident records that are related to the first performance incident, wherein each stored incident record comprises a stored set of performance metrics that characterize a past state of the computer resource and represent a past performance incident, and stored external information related to the past performance incident, wherein the stored external information comprises one or both of contextual information from a source other than the computer resource and user-provided annotation information, and
    wherein a stored incident record is related to the first performance incident if its stored set of performance metrics is similar to the first set of performance metrics or the first annotation information, or its stored external information is similar to the first set of performance metrics or the first annotation information; and
    display the received one or more stored incident records to the user.

* * * * *